(12) United States Patent
Kim et al.

(10) Patent No.: US 7,103,341 B2
(45) Date of Patent: Sep. 5, 2006

(54) HARMONIC CIRCUIT FOR IMPROVING LINEARITY

(75) Inventors: Sunguk Kim, Seoul (KR); Yongseok Kim, Seongnam-si (KR)

(73) Assignee: Integrant Technologies Inc., Seongnam-si (KR)

( * ) Notice: Subject to any disclaimer, the term of this patent is extended or adjusted under 35 U.S.C. 154(b) by 468 days.

(21) Appl. No.: 10/349,913

(22) Filed: Jan. 24, 2003

(65) Prior Publication Data

US 2004/0198259 A1    Oct. 7, 2004

(30) Foreign Application Priority Data

Jul. 25, 2002    (KR)    ............... 10-2002-0043959

(51) Int. Cl.
*H04B 1/10*    (2006.01)
(52) U.S. Cl. .................. 455/295; 455/67.13; 455/296
(58) Field of Classification Search .......... 455/63.1, 455/67.11, 67.13, 295, 296, 333, 232.1, 313; 330/149; 375/297
See application file for complete search history.

(56) References Cited

U.S. PATENT DOCUMENTS

| | | | | |
|---|---|---|---|---|
| 4,394,778 A * | 7/1983 | Ikeguchi et al. | .......... | 455/182.2 |
| 4,485,351 A * | 11/1984 | Schemmel et al. | .......... | 330/288 |
| 5,303,415 A * | 4/1994 | Takayama et al. | .......... | 455/296 |
| 5,781,069 A * | 7/1998 | Baskin | .......... | 330/149 |
| 5,848,044 A * | 12/1998 | Taguchi et al. | .......... | 369/53.26 |
| 5,907,262 A * | 5/1999 | Graeme et al. | .......... | 330/255 |
| 6,166,599 A * | 12/2000 | Aparin et al. | .......... | 330/149 |
| 6,753,728 B1 * | 6/2004 | Okubo et al. | .......... | 330/149 |
| 6,850,114 B1 * | 2/2005 | Nygren et al. | .......... | 330/149 |
| 2004/0008082 A1 * | 1/2004 | Dow | .......... | 330/51 |

* cited by examiner

*Primary Examiner*—Quochien B. Vuong
*Assistant Examiner*—Christian A. Hannon
(74) *Attorney, Agent, or Firm*—Global IP Counselors, LLP

(57) ABSTRACT

The present invention relates to a harmonic circuit for improving linearity, the harmonic circuit according to the present invention comprises a first terminal connected to a collector of a NPN transistor and a second terminal connected to an emitter of the NPN transistor, and removes inter-modulation noise from the signal appeared at the collector of the NPN transistor. The harmonic circuit includes a PNP transistor, a first resistor, and a second resistor. The PNP transistor generates harmonic components without affecting the main signal, and the harmonic components that are generated by the PNP transistor compensate the harmonic components that are generated by the NPN transistor by having load of different sign from the load of the harmonic components that are generated by the NPN transistor. In addition, the harmonic circuit further includes a phase shifter to compensate the phase distortion that is generated from non-linear devices, and it can reduce the inter-modulation noise more minutely by implementing the PNP transistor using a plurality of Darlington-connected PNP transistors.

20 Claims, 13 Drawing Sheets

HARMONIC CIRCUIT FOR IMPROVING LINEARITY

TECHNICAL FIELD

The present invention relates to a communication system, more specifically to a circuit for improving linearity by removing the inter-modulation noise using a harmonic circuit.

BACKGROUND OF THE INVENTION

It is known that the inter-modulation noise is one of the reasons that make the linearity of the receiver be poor. The inter-modulation noise deteriorates the receiving sensitivity at the receiving terminal.

The inter-modulation noise means that frequency components that are composed by the sum and the difference of harmonic components of the input signals are generated at the output terminal when two or more frequency signals are processed at the same time. The inter-modulation noise is usually generated in non-linear devices such as mixer and amplifier. Since the frequency band of the inter-modulation noise is near the frequency of the main signal, the inter-modulation noise is hardly removed by the band pass filter. As the inter-modulation noise became larger, the linearity of the receiver become deteriorated thereby reducing the receiving sensitivity.

To resolve the above problem, a method of improving linearity of the receiver by increasing a voltage or current applied to low-noise amplifier, intermediate frequency amplifier, etc. of the radio frequency receiver is disclosed in the Korean Patent No.10-0222404.

FIG. 1 is a block diagram showing a receiver disclosed in the Korean Patent No.10-0222404.

As shown in FIG. 1, the conventional receiver is constituted of a controller 111, the first attenuator 112, a low noise amplifier 113, a RF band filter 114, a mixer 116, an oscillator 115, the second attenuator 131, an intermediate frequency amplifier 117, an intermediate frequency band pass filter 118, a demodulator 119, and a signal processor 120.

Now, the operation of the conventional receiver disclosed in the Korean Patent No.10-0222404 will be described with reference to FIG. 1.

The first attenuator 112 attenuates an RF signal received via antenna according to an attenuation control signal ATC2. The low noise amplifier 113 amplifies the RF signal outputted from the attenuator 112, and the RF band filter 114 filters the RF signal of the receiving band and outputs it. The mixer 116 mixes the RF signal and the signal outputted from the oscillator to generate a intermediate frequency signal. The intermediate frequency amplifier 117 amplifies the signal outputted from the mixer 116. The intermediate frequency band pass filter 118 performs down conversion of the frequency of the received RF signal, and the demodulator 119 demodulates inputted signal to output I and Q signals. The signal processor 120 receives I and Q signals outputted from the demodulator 119, generates baseband digital data and voice signal, and detects and outputs RSSI (Received Signal Strength Indicator) and E/Io (signal-to-interference ratio). The controller 111 inputs RSSI and E/Io outputted from the signal controller 120 and generates an attenuation control signal ATT, and the first and the second control signals CLT1 and CLT2 to remove inter-modulation noise by analyzing the signal.

That is, if the linearity of the receiver decreases, the receiver disclosed in the Korean Patent No.10-0222404 improves the linearity of the receiver and the receiving sensitivity by increasing the voltage or current applied to the low noise amplifier 113, the intermediate frequency amplifier 117, and the first and the second attenuator 113 and 131 by generating a control signal from the controller 111. However, the above-described receiver has to be equipped with a separate control circuit to improve the linearity of the receiver thereby causing the complexity of the receiver.

SUMMARY OF THE INVENTION

An object of the present invention is to provide a harmonic circuit that is able to improve the linearity of the radio frequency receiver by removing inter-modulation noise.

Another object of the present invention is to provide an amplifier that is able to improve the linearity by itself using a harmonic circuit other than having a separate control circuit.

Still another object of the present invention is to provide a mixer that is able to improve the linearity by itself using a harmonic circuit other than having a separate control circuit.

In order to accomplish the objects, the present invention provides a harmonic circuit, for compensating inter-modulation noise from a signal from a collector of an NPN transistor having a base, emitter, and collector, comprising: a first terminal connected to the collector of the NPN transistor; a second terminal connected to the emitter of the NPN transistor; a PNP transistor having a base, emitter, and collector, in which the base is connected to the second terminal; a first resistor connected between the first terminal and the emitter of the PNP transistor; and a second resistor connected between the collector of the PNP transistor and ground. In the harmonic circuit according to an embodiment of the present invention, the PNP transistor comprises a plurality of Darlington-connected PNP transistors and the harmonic circuit may further comprise a phase shifter connected between the base of the PNP transistor and the second terminal.

According to an embodiment in which a harmonic circuit according to an embodiment of the present invention is applied to an amplifier, the amplifier comprises: an amplifying circuit having an input terminal and an output terminal, which amplifies a signal applied to the input terminal and outputs the signal to the output terminal; a harmonic source circuit having a first terminal connected to the input terminal of the amplifying circuit and a second terminal, which pre-distorts the signal applied to the first terminal and outputs the signal to the second terminal; and a harmonic load circuit having a first terminal connected to the output terminal of the amplifying circuit and a second terminal, which removes harmonic components of the signal applied to the first terminal and outputs the signal to the second terminal. In the amplifier according to an embodiment of the present invention, the amplifying circuit includes an inductor, a first and second NPN transistors, and a first and second resistors, wherein a collector of the first NPN transistor is connected to one terminal of the inductor, a base of the first NPN transistor forms the input terminal, an emitter of the first NPN transistor is connected to a base of the second NPN transistor, a collector of the second NPN transistor is connected to the one terminal of the inductor to form the output terminal, an emitter of the second NPN transistor is connected to one terminal of the second resistor, the other terminal of the inductor is connected to a voltage source, and the other terminals of the first and second resistors are grounded. The first terminal of the harmonic source circuit is connected to the input terminal of the amplifying circuit, the second terminal of the harmonic source circuit is connected to a connection point between the emitter of the first NPN transistor, the base of the second NPN transistor, the said first resistor of the amplifying circuit; and the first terminal of the harmonic load circuit is connected to the output terminal of the amplifying circuit and the second terminal is connected to a connection point between the emitter of the second NPN transistor and the second resistor of the amplifying circuit. The harmonic source circuit includes a PNP transistor having a base, emitter, and collector, in which the base is connected to the second terminal of the harmonic source circuit; a first resistor connected between the first terminal of the harmonic source circuit and the emitter of the PNP transistor; and a second resistor connected between the collector of the PNP transistor and ground. The harmonic source circuit of the amplifier according to an embodiment of the present invention may further include a phase shifter connected between the base of the PNP transistor and the second terminal of the harmonic source circuit. The harmonic load circuit includes a PNP transistor having a base, emitter, and collector, in which the base is connected to the second terminal of the harmonic load circuit; a first resistor connected between the first terminal of the harmonic load circuit and the emitter of the PNP transistor; and a second resistor connected between the collector of the PNP transistor and ground. The harmonic load circuit of the amplifier according to an embodiment of the present invention may further include a phase shifter connected between the base of the PNP transistor and the second terminal of the harmonic load circuit, and the PNP transistor may comprise a plurality of Darlington-connected PNP transistors.

According to another embodiment in which a harmonic circuit according to an embodiment of the present invention is applied to an amplifier, the amplifier comprises: an amplifying circuit having an input terminal and an output terminal, which amplifies a signal applied to the input terminal and outputs the signal to the output terminal; a harmonic circuit having a first terminal connected to the output terminal of the amplifying circuit and a second terminal connected to the input terminal of the amplifying circuit, which removes harmonic components of the signal applied to the first terminal and outputs the signal to the second terminal. The amplifying circuit includes an inductor, a first and second NPN transistors, and a first and second resistors, wherein a collector of the first NPN transistor is connected to one terminal of the inductor, a base of the first NPN transistor forms the input terminal, an emitter of the first NPN transistor is connected to a base of the second NPN transistor and one terminal of the first resistor, a collector of the second NPN transistor is connected to the one terminal of the inductor to form the output terminal, an emitter of the second NPN transistor is connected to one terminal of the second resistor, the other terminal of the inductor is connected to a voltage source, and the other terminals of the first and second resistors are grounded. The harmonic circuit includes a PNP transistor having a base, emitter, and collector, in which the base is connected to the second terminal of the harmonic circuit; a first resistor connected between the first terminal of the harmonic circuit and the emitter of the PNP transistor; and a second resistor connected between the collector of the PNP transistor and ground. The harmonic circuit of the amplifier according to another embodiment of the present invention may further include a phase shifter connected between the base of the PNP transistor and the second terminal of the harmonic circuit. The harmonic circuit of the amplifier according to another embodiment of the present invention may further include a diode device having a first terminal and a second terminal, in which the first terminal of the diode forms the first terminal of the harmonic circuit and the second terminal of the diode forms the second terminal of the harmonic circuit, and the harmonic circuit may further include a phase shifter connected between the second terminal of the diode device and the second terminal of the harmonic circuit. In addition, according to the amplifier according to another embodiment of the present invention, the amplifier may comprises a variable resistor connected between the input terminal of the amplifying circuit and the emitter of the second NPN transistor of the amplifying circuit.

According to still another embodiment in which a harmonic circuit according to an embodiment of the present invention is applied to a mixer, the mixer comprises: an amplifying circuit for amplifying an input signal; a mixing circuit for mixing an output signal of the amplifying circuit and local oscillating signal and outputting intermediate frequency signal or baseband signal; and a harmonic circuit, having a first and a second terminals connected to the amplifying circuit, for removing harmonic component of a signal applied from the first terminal and outputting the signal to the second terminal. In the mixer according to an embodiment of the present invention, the amplifying circuit includes at least one NPN transistor and the first and second terminals of the harmonic circuit are connected to a collector and emitter of the NPN transistor, respectively. The harmonic circuit includes: a PNP transistor having a base, emitter, and collector, in which the base is connected to the second terminal of the harmonic circuit; a first resistor connected between the first terminal of the harmonic circuit and the emitter of the PNP transistor; and a second resistor connected between the collector of the PNP transistor and ground. In the mixer according to an embodiment of the present invention, the PNP transistor of the harmonic circuit may comprise a plurality of Darlington-connected PNP transistors, and the harmonic circuit may further include a phase shifter connected between the base of the PNP transistor and the second terminal of the harmonic circuit.

DETAILED DESCRIPTION

Now, operation and constitution of a harmonic circuit according to an embodiment of the present invention will be described in detail, and another embodiments in which the embodiment is applied will also be described.

Figure 1:
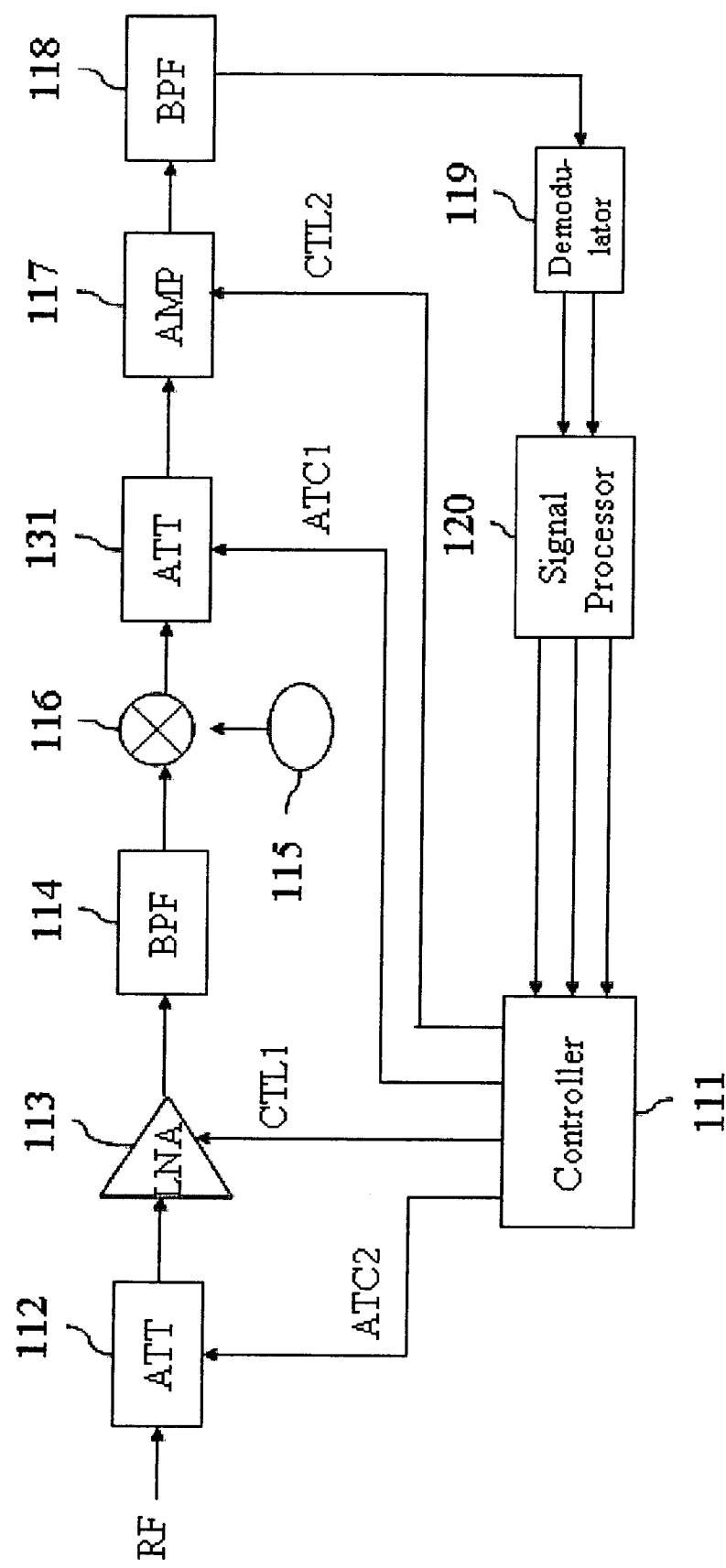
FIG. 1 is a block diagram showing a conventional receiver.
Figure 2:
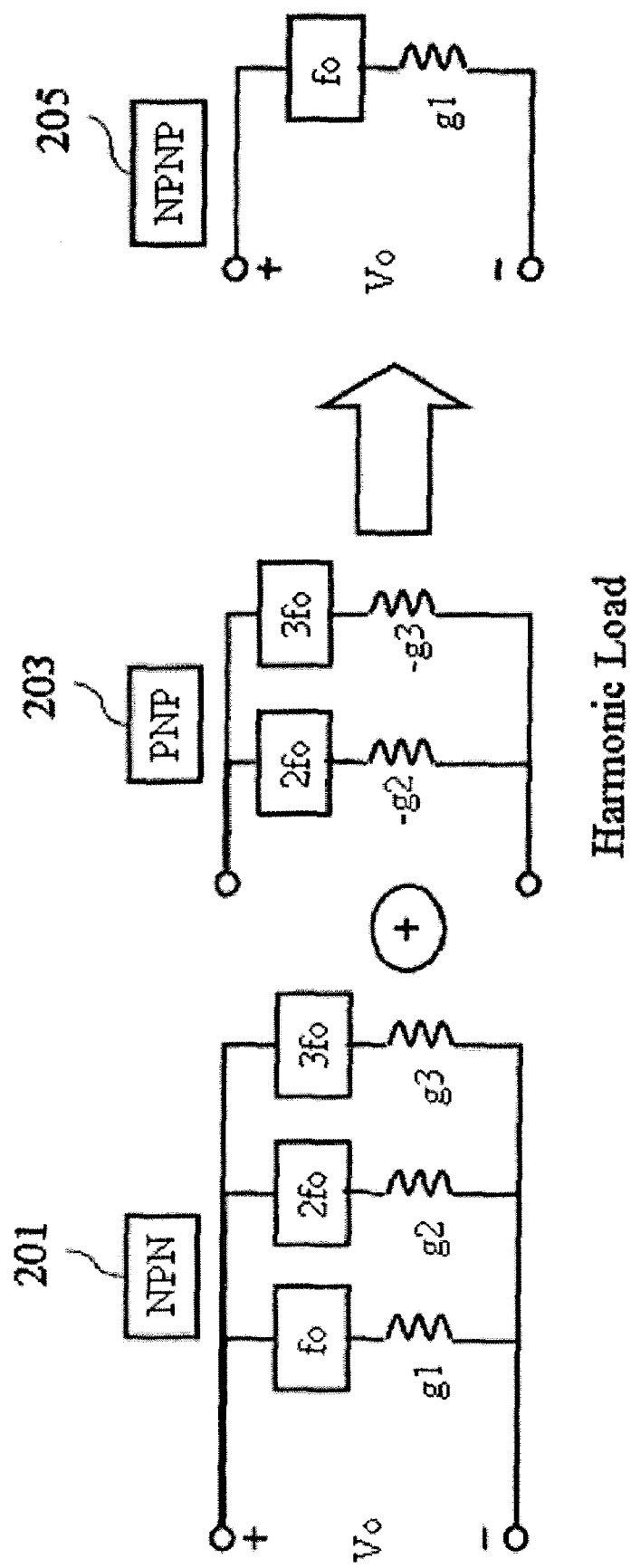
FIG. 2 is an equivalent circuit diagram showing resistance elements that influence to the main signal and each harmonic component when specific signal is applied to a NPN transistor and a PNP transistor, respectively.

Operation of a Harmonic Circuit According to an Embodiment of the Present Invention FIG. 2 is an equivalent circuit diagram showing resistance elements that influence to the main signal and each harmonic component when specific signal is applied to a NPN transistor 201 and a PNP transistor 203, respectively.

In case of the NPN transistor 201, when main signal $f_0$, double harmonic $2f_0$, and triple harmonic $3f_0$ are applied to the NPN transistor 201, resistance elements of the NPN transistor 201 which influence each signal are indicated equivalently as g1, g2, and g3, respectively.

In case of the PNP transistor 203, when double harmonic $2f_0$ and triple harmonic $3f_0$ are applied to the PNP transistor 203, resistance elements of the PNP transistor 203 which influence each signal are indicated equivalently as -g2 and -g3, respectively. The PNP transistor does not influence the main signal substantially because of the characteristic that the gain of that is relatively small. However, the PNP transistor 203 also generates harmonics to the main signal like the NPN transistor 201, and at this time each harmonic experiences different amount of load.

Figure 3:
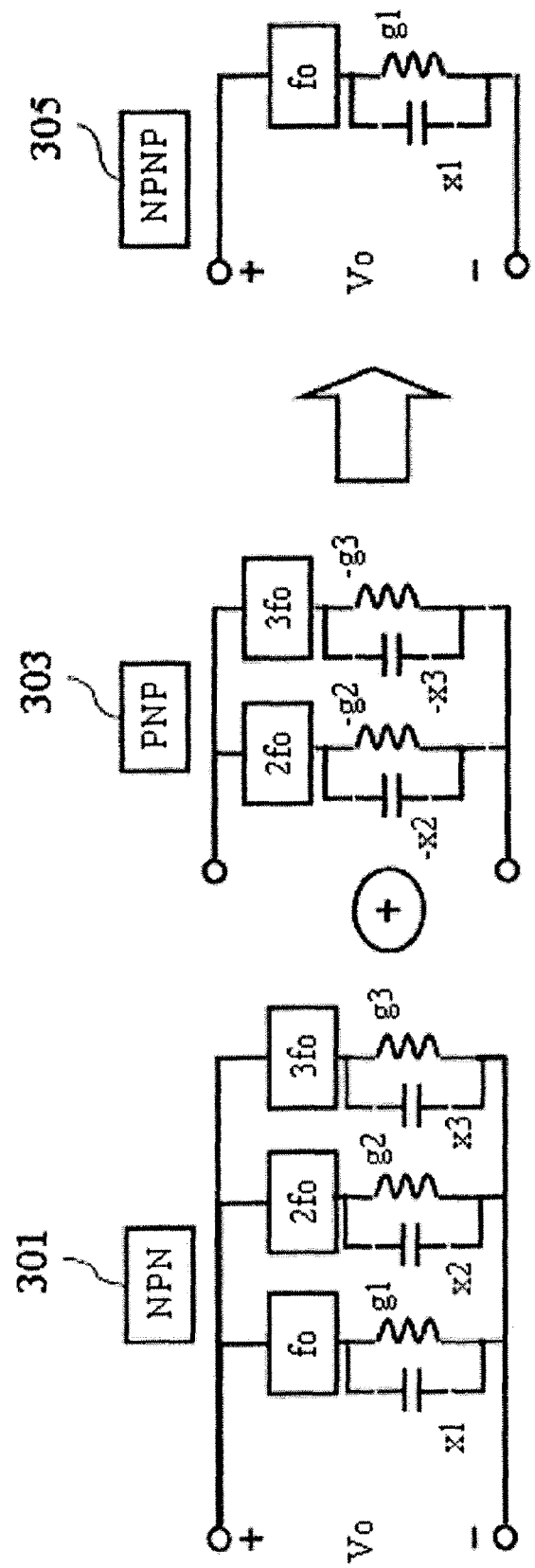
FIG. 3 is an equivalent circuit diagram showing resistance elements and reactance elements that influence to the main signal and each harmonic component when specific signal is applied to a NPN transistor and a PNP transistor, respectively.

FIG. 3 is a equivalent circuit diagram showing resistance elements and reactance elements which influence to the main signal and each harmonic component when specific signal is applied to a NPN transistor 301 and a PNP transistor 303, respectively.

As shown in FIG. 3, a load which influences each signal can be represented as a parallel connection between a resistance element g and a reactance element x. In case of the NPN transistor 301, when main signal $f_0$, double harmonic $2f_0$, and triple harmonic $3f_0$ are applied to the NPN transistor 301, loads of the NPN transistor 301 which influence each signal are indicated equivalently as parallel connections between capacitors x1, x2, and x3 and resistances g1, g2, and g3, respectively.

In case of the PNP transistor 303, when double harmonic $2f_0$ and triple harmonic $3f_0$ are applied to the PNP transistor 303, loads of the PNP transistor 303 which influence each signal are indicated equivalently as parallel connections between capacitors -x2 and -x3 and resistances -g2 and -g3, respectively. Also in this case, the PNP transistor does not influences the main signal substantially while it generates loads to the harmonics of the main signal as in FIG. 2.

Resistance elements g1, g2, and g3 and reactance elements x1, x2, and x3 which influence the signal applied to the NPN transistor 301 have values of opposite sign to resistance elements -g2 and -g3 and reactance elements -x2 and -x3 which influence the signal applied to the PNP transistor 303. Therefore, as shown in FIGS. 2 and 3, if PNP transistors 203 and 303, i.e. harmonic loads, are connected properly to the nonlinear circuits comprising NPN transistors 201 and 301, they become linear NPNP transistors 205 and 305 because the nonlinear components that are generated from the NPN transistors are compensated.

Figure 4A:
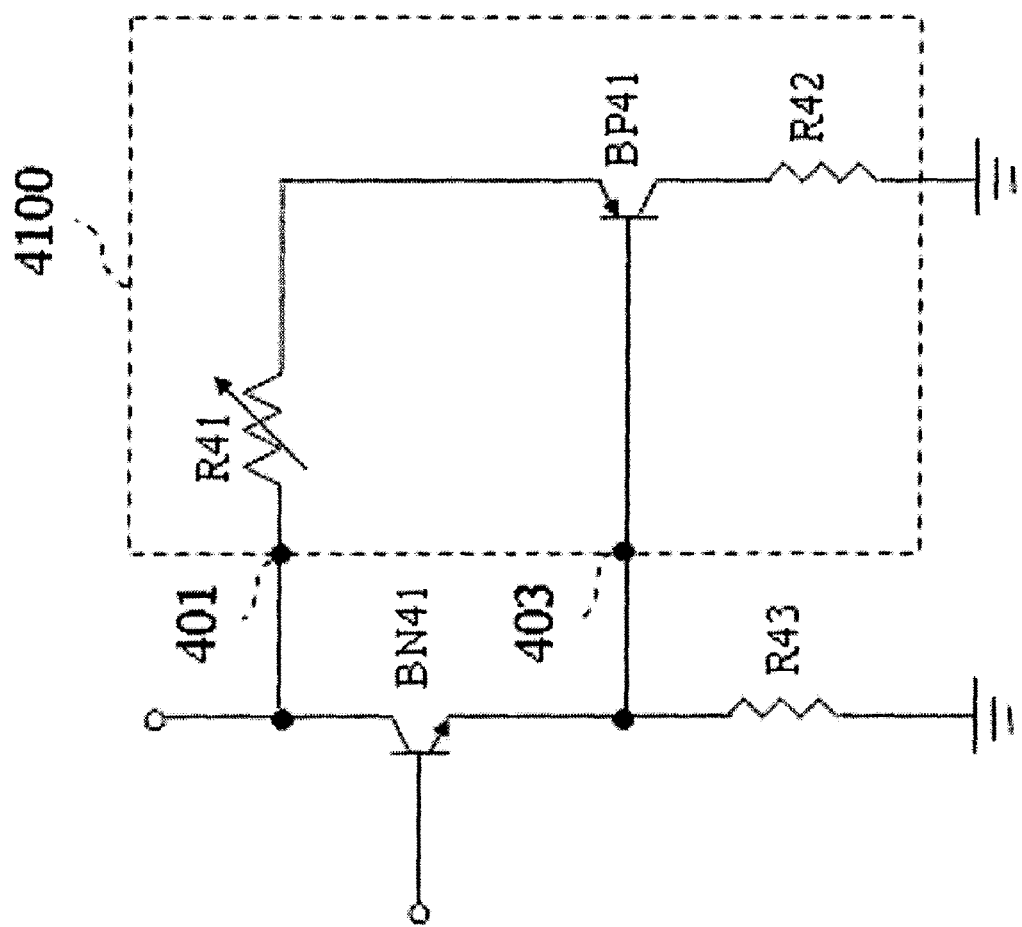
FIG. 4a is a circuit diagram showing a harmonic circuit according to an embodiment of the present invention that is connected to an NPN transistor.

Basic Structure of a Harmonic Circuit According to an Embodiment of the Present Invention FIG. 4a is a circuit diagram showing a harmonic circuit according to an embodiment of the present invention which is connected to an NPN transistor.

As shown in FIG. 4a, a harmonic circuit 4100 has a first terminal 401 and a second terminal 403. The first terminal 401 is connected to the collector of a NPN transistor, and the second terminal 403 is connected to the emitter of the NPN transistor.

Now, the constitution of the harmonic circuit 4100 is to be described in more detail.

The harmonic circuit 4100 includes a PNP transistor BP41, a first resistor R41, and a second resistor R42. One terminal of the first resistor R41 is connected to the first terminal 401 of the harmonic circuit 4100, the other terminal of that is connected to the emitter of the PNP transistor BP41. The base of the PNP transistor BP41 is connected to the second terminal 403 of the harmonic circuit 4100, the collector is connected to one terminal of the second resistor R42. The other terminal of the second resistor R42 is grounded. The first resistor R41 can be implemented as a variable resistor as shown in FIG. 4a.

Figure 4B:
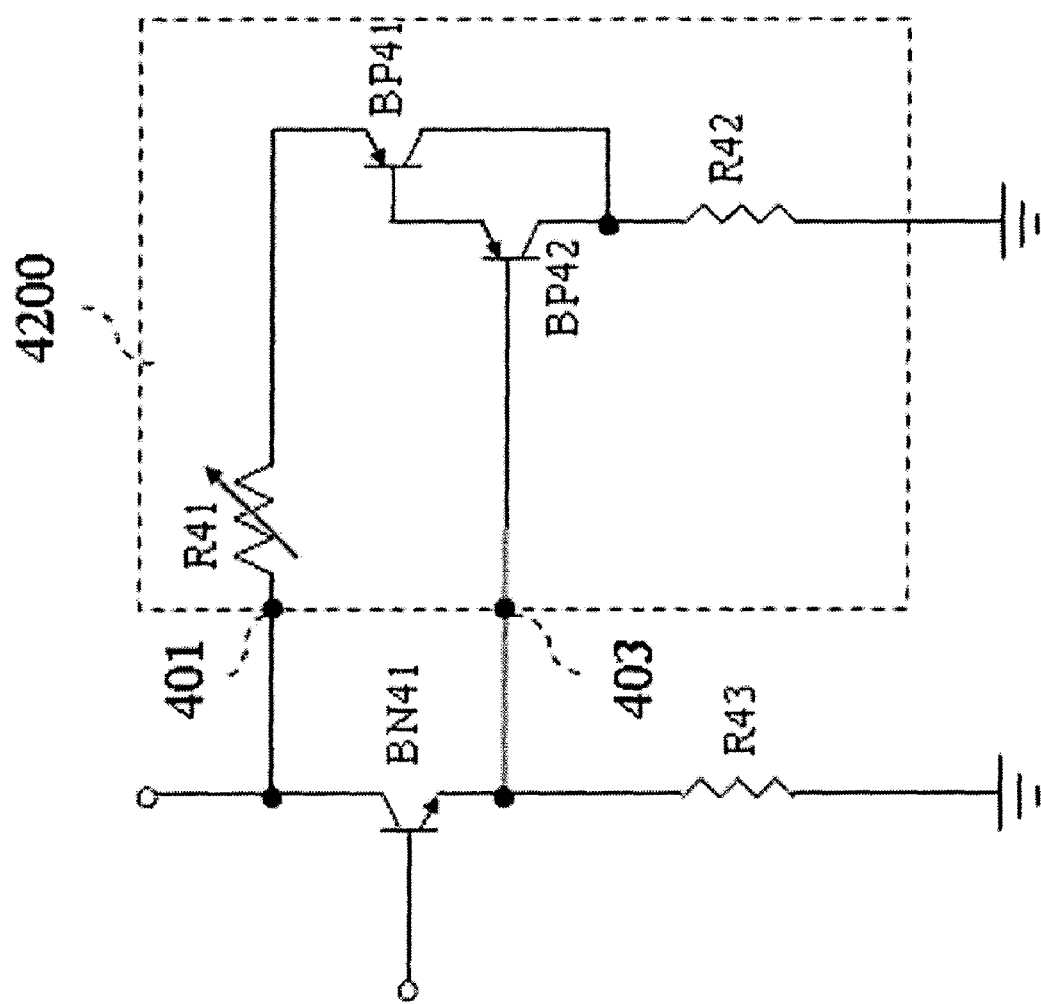
FIG. 4b is a circuit diagram showing a harmonic circuit according to another embodiment of the present invention that is connected to an NPN transistor.

According to a harmonic circuit according to another embodiment of the present invention, as shown in FIG. 4b, PNP transistor can be implemented by a plurality of Darlington-connected PNP transistors. Since the gain of the PNP transistor BP41 is smaller than that of the NPN transistor BN41, the load of the PNP transistor BP41 which influence the signal is also smaller than that of the NPN transistor BN41. Therefore, if the harmonic circuit is implemented using a plurality of PNP transistors, it is possible to obtain more linear NPNP transistor. That is, according to another embodiment of the present invention, the PNP transistor BP41 as shown in FIG. 4a is substituted by the first PNP transistor BP41 and the second PNP transistor BP42 which are Darlington-connected as shown in FIG. 4b. In FIG. 4b, it is shown that the PNP transistor BP41 is substituted by the first and the second PNP transistors BP41 and BP42, however, the idea of the present invention is not confined to a specific number of the transistors as apparent for the person skilled in the art, i.e., the number of the transistors can be changed according to various embodiments.

Figure 5A:
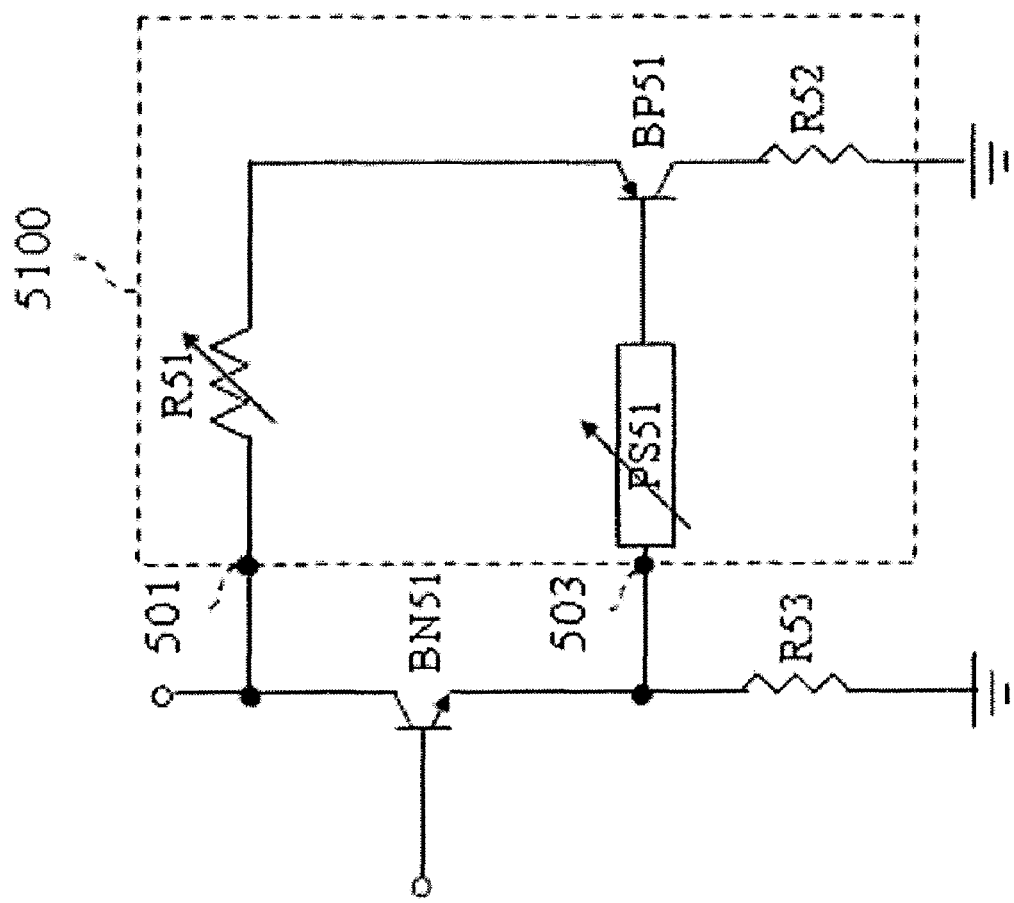
FIG. 5a is a circuit diagram showing a harmonic circuit according to another embodiment of the present invention that is connected to a NPN transistor.

FIG. 5a is a circuit diagram of a harmonic circuit according to another embodiment of the present invention which is connected to a NPN transistor.

As shown in FIG. 5a, a harmonic circuit 5100 according to another embodiment of the present invention has a difference with the circuits shown in FIGS. 4a and 4b in that a phase shifter PS51 is provided to the base of a PNP transistor BP51. That is, according to the embodiment shown in FIG. 5a, the harmonic circuit 5100 includes a PNP transistor, a phase shifter PS51, a first resistor R51, and a second resistor R52. One terminal of the phase shifter PS51 is connected to the base of the PNP transistor BP51, and the other terminal is connected to the second terminal 503 of the harmonic circuit 5100. If phase shifter PS51 is comprised in the harmonic circuit 5100, the linearity of the NPN transistor can be further improved by removing the reactance components and phase distortion generated from the NPN transistor BN51 through the pase shifter PS51.

Figure 5B:
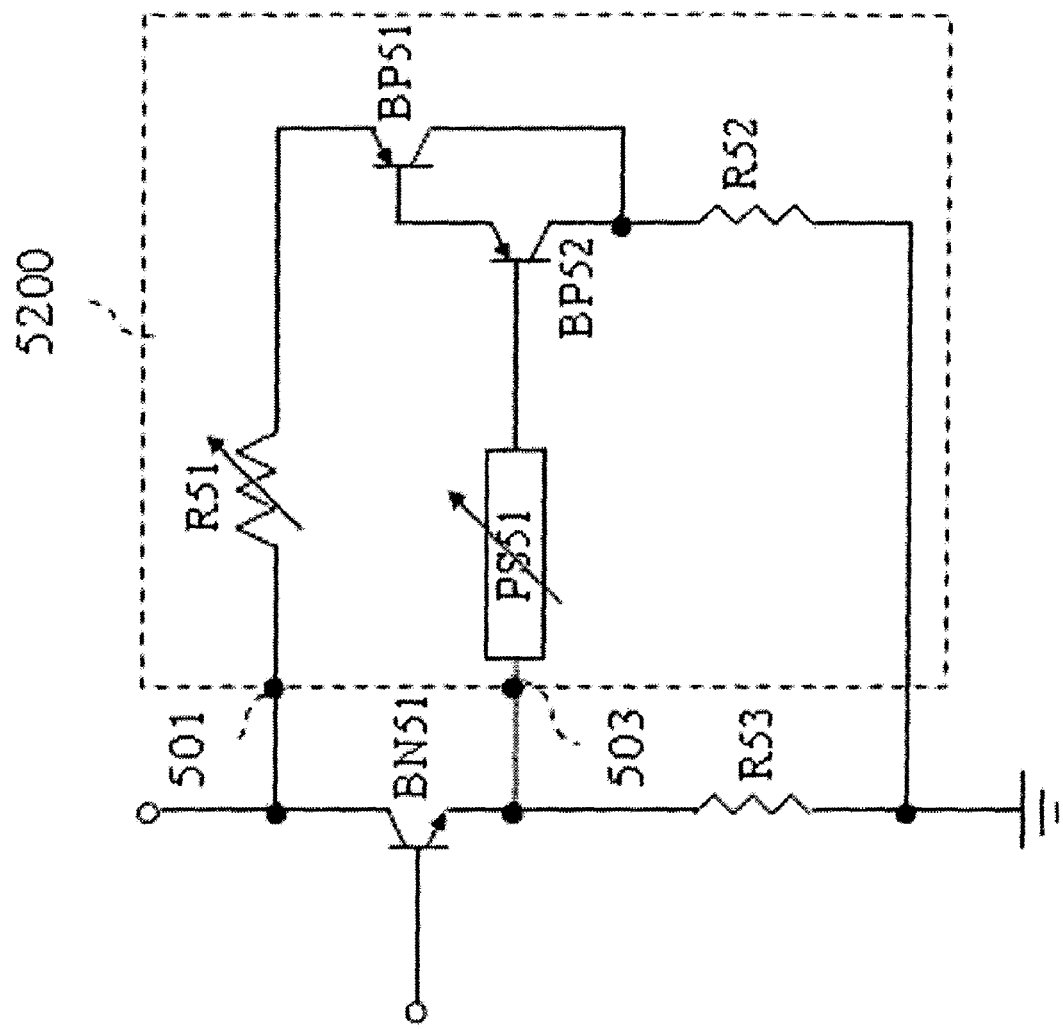
FIG. 5b is a circuit diagram showing a harmonic circuit according to another embodiment of the present invention that is connected to a NPN transistor.

According to a harmonic circuit 5200 according to another embodiment of the present invention, as in the above described harmonic circuit 4200, the PNP transistor BP51 can be implemented by a connection of a plurality of PNP transistors as shown in FIG. 5b. That is, according to an embodiment of the present invention, the PNP transistor BP51 in FIG. 5a can be substituted by two PNP transistors BP51 and BP52 which are Darlington-connected to each other as shown in FIG. 5b.

Embodiment in Which a Harmonic Circuit According to an Embodiment of the Present Invention is Applied to an Amplifier In the following, an embodiment in which a harmonic circuit according to an embodiment of the present invention is applied to an amplifier will be described after describing the constitution and operation of the conventional amplifier.

Figure 6:
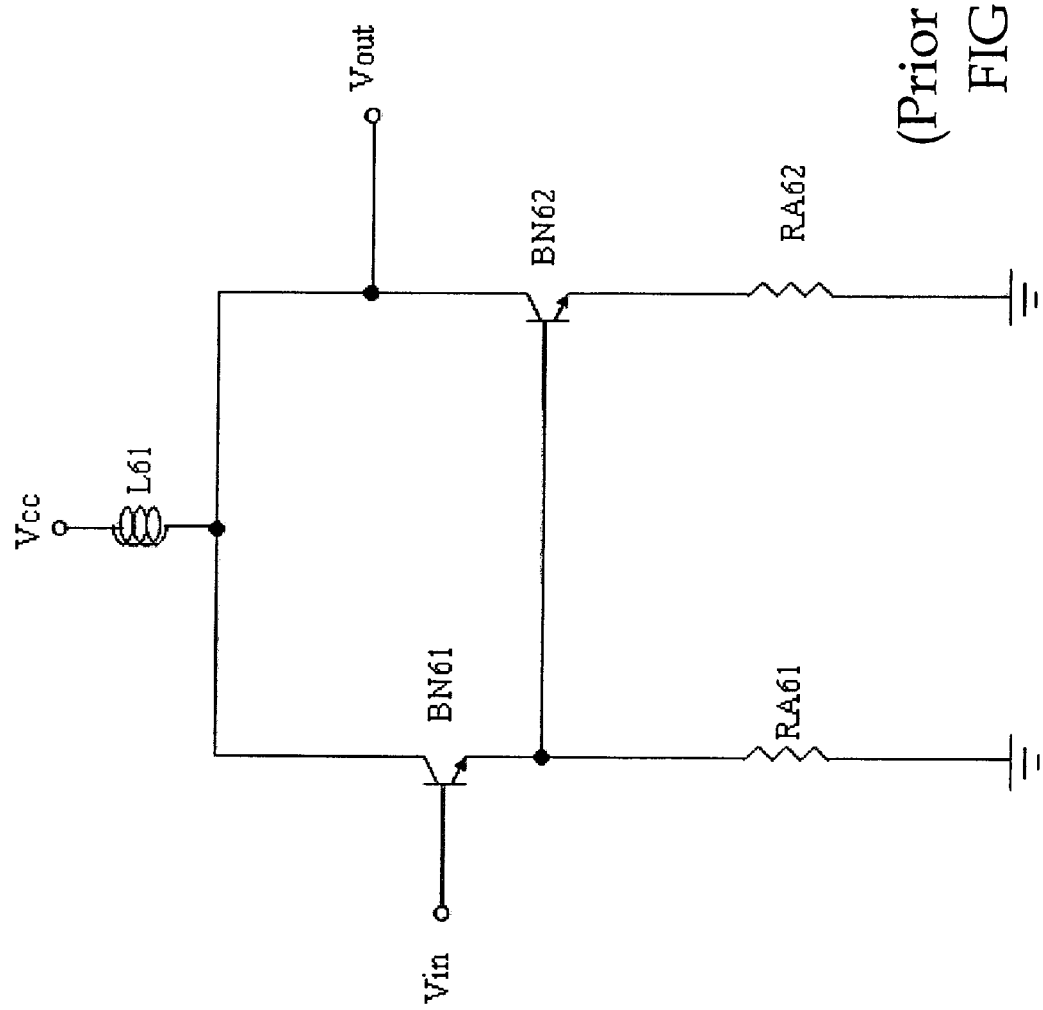
FIG. 6 is a circuit diagram of a conventional amplifier.

FIG. 6 is a circuit diagram of a conventional amplifier.

As shown in FIG. 6, the conventional amplifier has an input terminal Vin and an output terminal Vout, and outputs amplified signal of input signal that is applied to the input terminal Vin through the output terminal Vout.

Now, the constitution of the conventional amplifier will be described in detail with reference to FIG. 6.

The amplifier includes an inductor L61, a first and a second NPN transistors BN61 and BN62, and a first and a second resistors RA61 and RA62. The collector of the first NPN transistor BN61 is connected to one terminal of the inductor L61, the base forms the input terminal Vin of the amplifier. The emitter of the first NPN transistor BN61 is connected to the base of the second NPN transistor BN62 and one terminal of the first resistor RA61. The collector of the second NPN transistor BN62 is connected to one terminal of the inductor L61, and forms the output terminal, and the emitter is connected to one terminal of the second resistor RA62. The other terminal of the inductor L61 is connected to the voltage source Vcc, and the other terminals of the first and the second resistors RA61 and RA62 are grounded. It is preferable that a first and a second capacitors (not shown) are connected to the input terminal Vin and the output terminal Vout of the amplifier, respectively. At this time, the first and the second capacitors block incoming of the direct current to the input terminal Vin and the output terminal Vout.

Now, the operation and problem of the amplifier shown in FIG. 6 will be described.

If a radio frequency signal is applied through the input terminal Vin of the amplifier, the signal is first amplified by the first NPN transistor BN61. The signal that is amplified by the first NPN transistor is applied to the base of the second NPN transistor BN62 and amplified by the second NPN transistor BN62 again.

According to the conventional amplifier, if the signal is applied via the input terminal Vin, harmonics of the input signal are generated as well as the input signal is amplified due to non-linearity of the first NPN transistor BN61. Such harmonic components are also applied through the base of the second NPN transistor BN62 and amplified again. Therefore, inter-modulation noise made of each harmonic component and combinations thereof is outputted through the output terminal Vout of the amplifier as well as the amplified signal of the input signal, and it influences whole system as described above.

Figure 7:
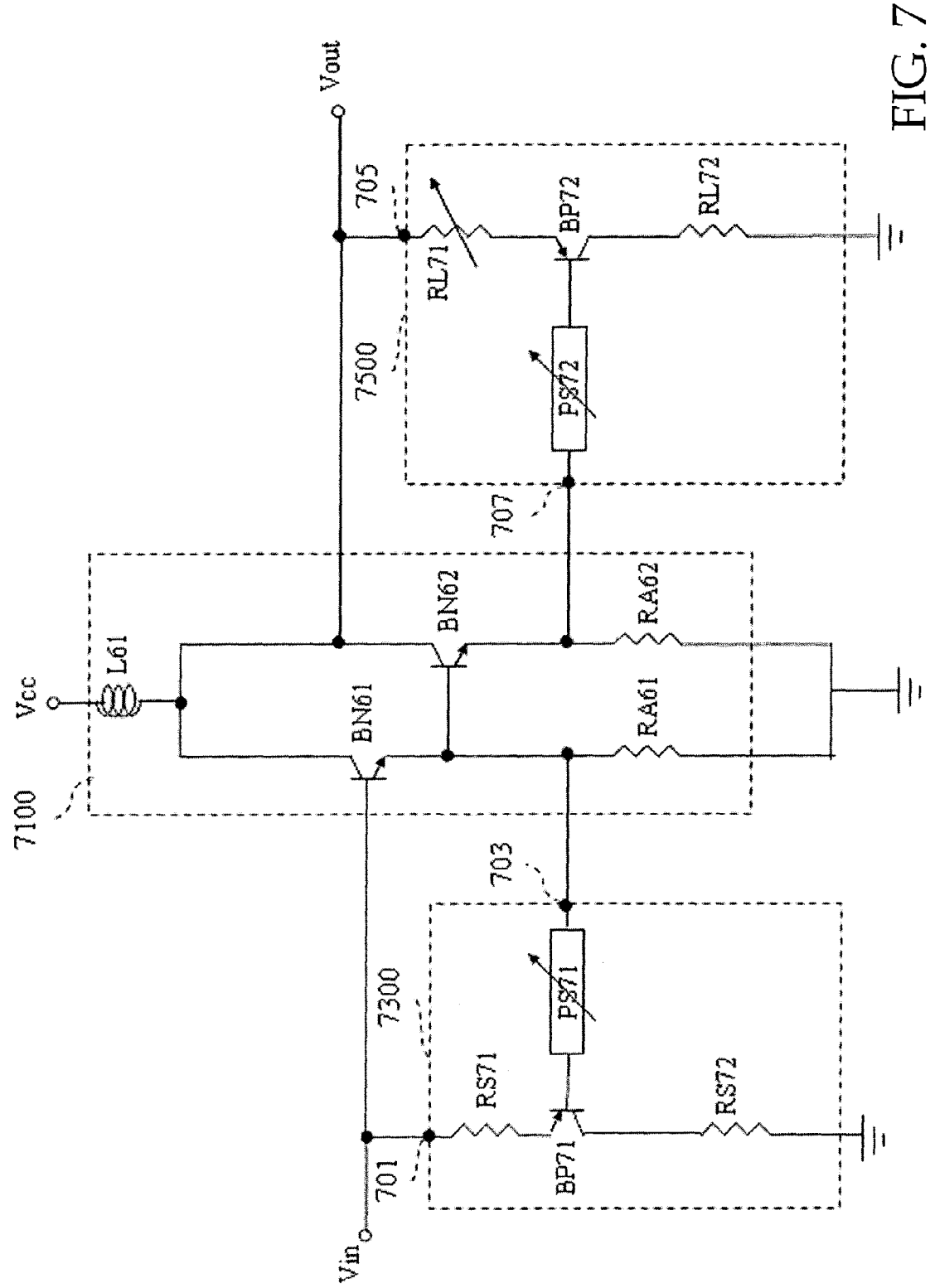
FIG. 7 is a circuit diagram showing an embodiment in which a harmonic circuit according to the present invention is implemented to an amplifier.

FIG. 7 is a circuit diagram showing an embodiment in which a harmonic circuit according to an embodiment of the present invention is applied to an amplifier.

As shown in FIG. 7, the amplifier to which a harmonic circuit according to an embodiment of the present invention is applied includes an amplifying circuit 7100, a harmonic source circuit 7300, and a harmonic load circuit 7500.

To the input terminal Vin and the output terminal Vout of the amplifying circuit 7100, the harmonic source circuit 7300 and the harmonic load circuit 7500 are connected, respectively. The harmonic source circuit 7300 and the harmonic load circuit 7500 are connected to the input terminal Vin and the output terminal Vout of the amplifying circuit 7100, and they pre-distort the signal of the input terminal Vin and remove the inter-modulation noise which appears on the signal of the output terminal Vout.

The harmonic source circuit 7300 has the first terminal 701 and the second terminal 703, and the first terminal 701 and the second terminal 703 are connected to the input terminal Vin of the amplifying circuit 7100 and the connection point of the emitter of the first NPN transistor BN61, the base of the second NPN transistor, and one terminal of the first resistor RA61 of the amplifying circuit 7100, respectively. The harmonic load circuit 7500 has the first terminal 705 and the second terminal 707, and the first terminal 705 and the second terminal 707 are connected to the output terminal Vout of the amplifying circuit 7100 and the connection point of the emitter of the second NPN transistor BN62 and one terminal of the second resistor RA62 of the amplifying circuit 7100, respectively.

Now, the constitution of the circuit shown in FIG. 7 will be described in more detail.

The harmonic source circuit 7300 includes the first and the second resistors RS71 and RS72, and a PNP transistor BP71. One terminal of the first resistor RS71 is connected to the first terminal 701 of the harmonic source circuit 7300, and the other terminal is connected to the emitter of the PNP transistor BP71. The base of the PNP transistor BP71 is connected to the second terminal 703 of the harmonic source circuit 7300, and the collector is connected to one terminal of the second resistor RS72. The other terminal RS72 of the second resistor is grounded. According to the harmonic source circuit 7300 of an embodiment of the present invention, as shown in FIG. 7, may further include a phase shifter PS71, then one terminal of the phase shifter PS71 is connected to the base of the PNP transistor BP71, and the other terminal is connected to the second terminal 703 harmonic source circuit 7300.

The harmonic load circuit 7500 includes the first and the second resistors RL71 and RL72, and a PNP transistor BP72. One terminal of the first resistor RL71 is connected to the first terminal 705 of the harmonic load circuit 7500, and the other terminal is connected to the emitter of the PNP transistor BP72. The base of the PNP transistor BP72 is connected to the second terminal 707 of the harmonic load circuit 7500, and the collector is connected to one terminal of the second resistor RL72. The other terminal of the second resistor RL72 is grounded. According to the harmonic load circuit 7500 of an embodiment of the present invention, as shown in FIG. 7, may further include a phase shifter PS72, then one terminal of the phase shifter PS72 is connected to the base of the PNP transistor BP72, and the other terminal is connected to the second terminal 707 of harmonic load circuit 7500. In addition, the first resistor RL71 can be implemented as a variable resistor as shown in FIG. 7.

Moreover, according to another embodiment of the present invention, the PNP transistor BP72 which is included in the harmonic load circuit 7500 can be implemented a plurality of Darlington-connected PNP transistors as described above with reference to FIGS. 4b and 5b. If the harmonic load circuit 7500 is constituted of a plurality of PNP transistors, the inter-modulation noise generated on the output terminal Vout of the amplifying circuit 7100 can be reduced in detail, and the linearity of the amplifier can be further improved.

Now, the operation of the amplifier according to an embodiment of the present invention is described.

If an input signal Vin is applied via the first terminal 701 of the harmonic source circuit 7300, harmonic components of the input signal Vin are generated by the PNP transistor BP71. Each harmonic component that is generated by the PNP transistor BP71 experiences difference amount of load as described above, and the loads that influence the harmonic components have positive values. Moreover, if the phase shifter PS71 is added to the harmonic source circuit 7300, phases of the harmonic signals that are generated by the PNP transistor BP71 are more distorted.

That is, harmonic components that are generated by the first NPN transistor BN61 of the amplifying circuit 7100 are compensated with pre-distorting the input signal Vin by the harmonic source circuit 7300 and outputting the distorted signal to the second terminal 703 of the harmonic source circuit 7300. In addition, the linearity and OIP3 (Output Third-Order Intercept Point) value can be improved by compensating harmonic components that are generated from the second NPN transistor BN62 by applying the distorted signals that are outputted from the second terminal 703 to the base of the second NPN transistor BN62.

The harmonic load circuit 7500 is provided with the output signal Vout of the amplifying circuit 7100 via the first terminal 705. The harmonic load circuit 7500 removes the inter-modulation noise to more detailed extent from the output signal Vout whose inter-modulation noise has already removed through the harmonic source circuit 7300.

That is, the PNP transistor BP72 generates only harmonic components without affecting the main signal, and the harmonic components that are generated by the PNP transistor BP72 have positive values as described above. Therefore, they compensate the harmonic components having negative loads that are generated by the first and the second NPN transistors BN61 and BN62 of the amplifier to improve the OIP3 value and linear operation of the amplifier. In addition, reactance components and phase distortion of the harmonic components appeared on the output signal Vout can be compensated in more detail by adding a phase shifter PS72 to the harmonic load circuit 7500.

Figure 8:
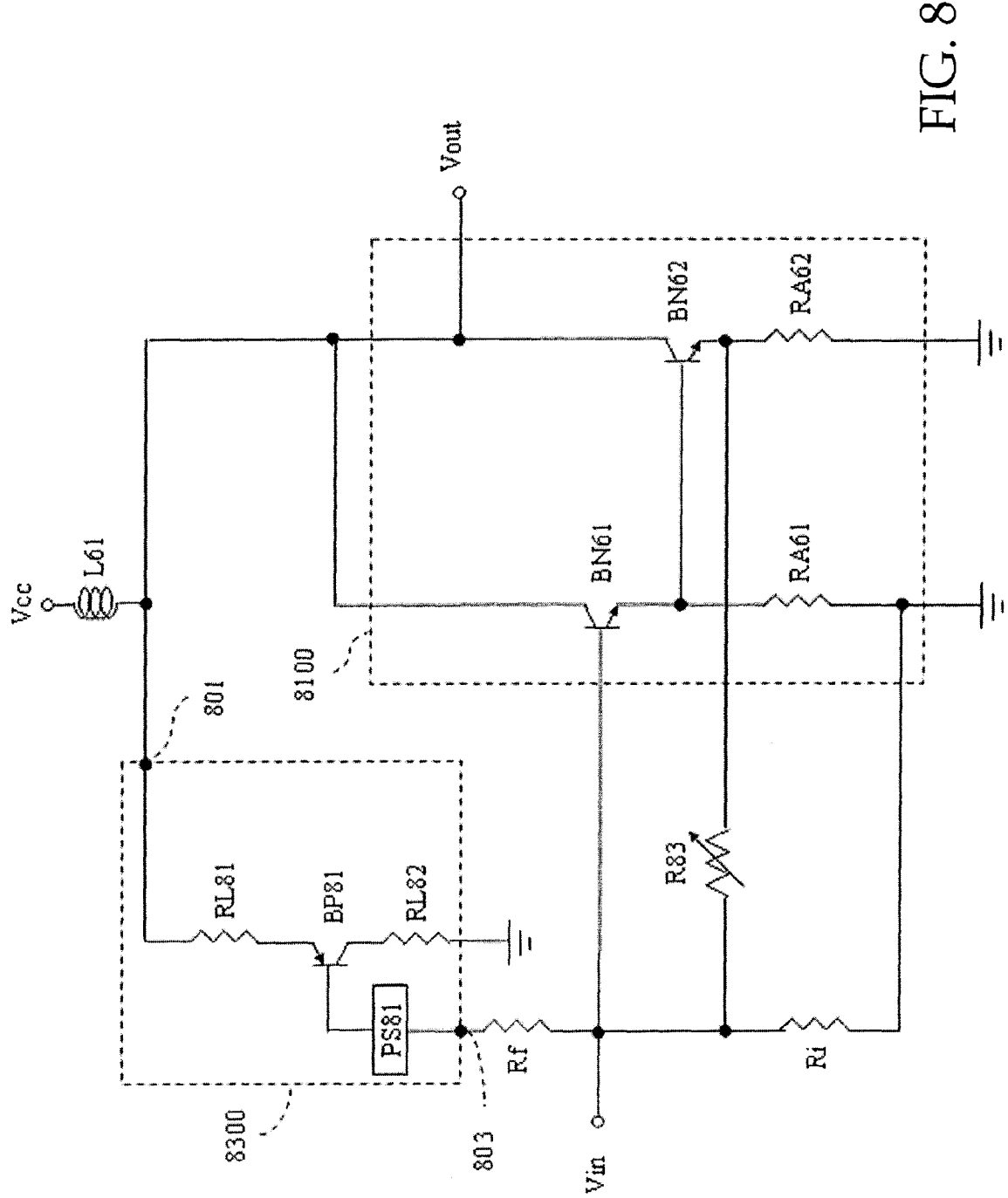
FIG. 8 is a circuit diagram showing another embodiment in which a harmonic circuit according to the present invention is implemented to an amplifier.

FIG. 8 is a circuit diagram showing another embodiment in which a harmonic circuit according to the present invention is applied to an amplifier.

As shown in FIG. 8, an amplifier according to another embodiment of the present invention includes a amplifying circuit 8100 and a harmonic circuit 8300. And it is different from the circuit shown in FIG. 7 in that the harmonic circuit 8300 is connected to the amplifying circuit to feedback. That is, the first terminal 801 of the harmonic circuit 8300 is connected to the output terminal Vout of the amplifying circuit 8100, and the second terminal 803 is connected to the input terminal Vin of the amplifying circuit 8100. Then, harmonic components appeared on the output terminal Vout are removed by feedbacking them. In case that the harmonic circuit is connected to feedback, it is preferable that resistor elements Rf and Ri are provided between the second terminal 803 of the harmonic circuit 8300 and the input terminal Vin and between the input terminal Vin and the ground, respectively.

Moreover, as shown in FIG. 8, a variable resistor R83 can be connected between the input terminal Vin of the amplifier and the emitter of the second NPN transistor BN62 of the amplifying circuit 8100. In this case, the variable resistor R83 hardly influences on the main gain of the amplifier, but apply feedbacked signal from the harmonic circuit 8300 to the second transistor BN62 of the amplifying circuit 8100 directly. Therefore, the linearity of the amplifier will be more improved.

Figure 9:
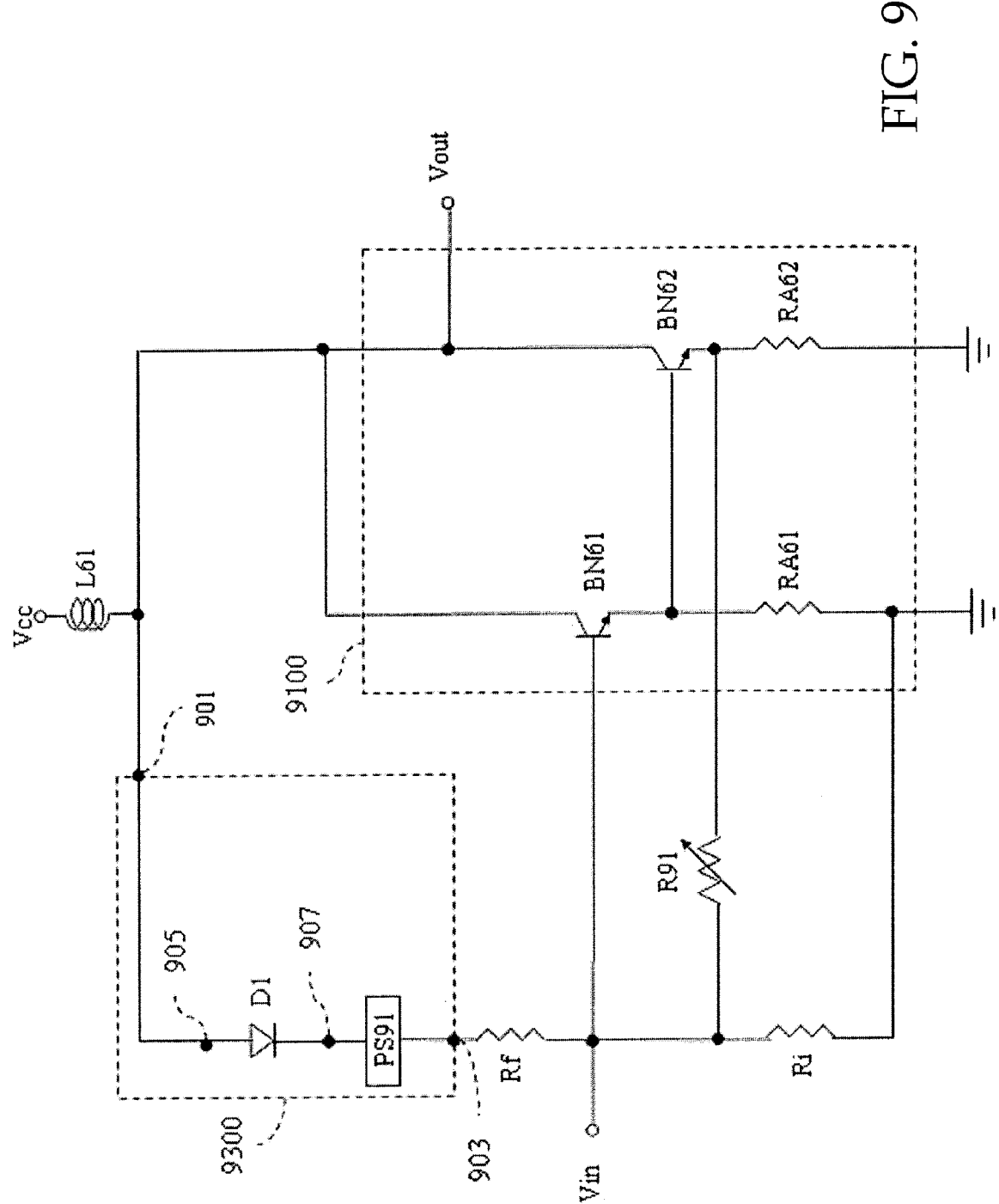
FIG. 9 is a circuit diagram showing another embodiment in which a harmonic circuit according to the present invention is implemented to an amplifier.

FIG. 9 is a circuit diagram showing another embodiment in which a harmonic circuit according to the present invention is applied to an amplifier.

As shown in FIG. 9, an amplifier according to another embodiment of the present invention includes an amplifying circuit 9100 and a harmonic circuit 9300. The amplifier according to another embodiment is different from the circuit shown in FIG. 8 in that the harmonic circuit 9300 has a diode element DI. The diode element DI has the first and the second terminals 905 and 907, and passes + current which is applied to the first terminal 905 to the second terminal 907. The first terminal 905 of the diode element DI forms the first terminal 901 of the harmonic circuit 9300, and the second terminal 907 forms the second terminal 903 of the harmonic circuit 9300. The harmonic circuit 9300 compensates the harmonic components that are appeared on the output terminal Vout with the harmonic components that are generated from the diode element DI by feedbacking the signal of the output terminal Vout through the diode element DI, and further improves the OIP3 value of the amplifier. Moreover, in the embodiment shown in FIG. 9, a phase shifter can be provided between the second terminal 903 of the harmonic circuit 9300 and the second terminal 907 of the diode element DI.

Embodiment in Which a Harmonic Circuit is Applied to a Mixer

In the following, an embodiment in which a harmonic circuit according to an embodiment of the present invention is applied to a mixer will be described after describing the constitution and operation of the conventional mixer.

Figure 10:
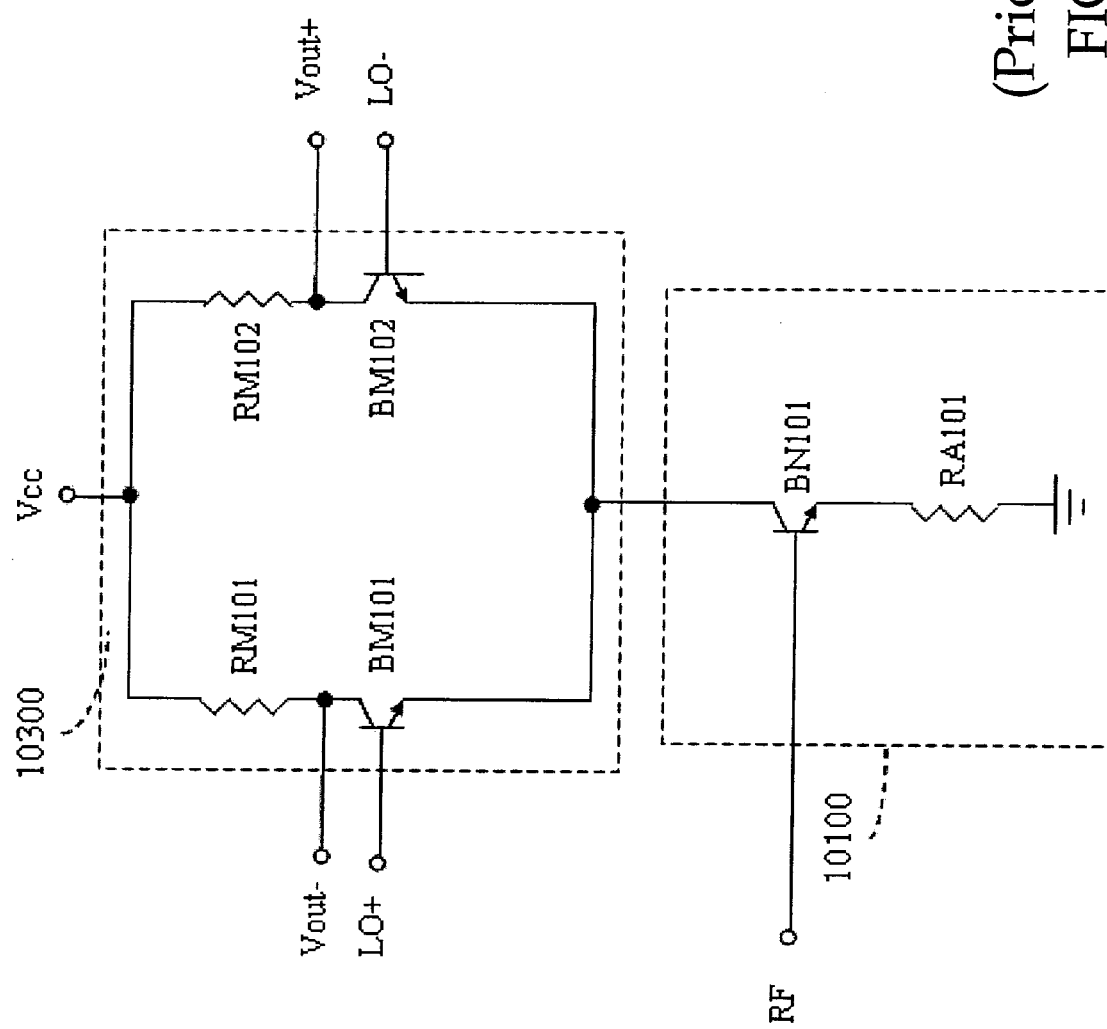
FIG. 10 is a circuit diagram of a conventional mixer.

FIG. 10 is a circuit diagram of a conventional mixer. As shown in FIG. 10, the conventional mixer has an amplifying circuit 10100 and a mixing circuit 10300. The amplifying circuit 10100 includes a NPN transistor BN101 and a resistor RA101, and the mixing circuit includes the first and the second NPN transistors BM101 and BM102, and the first and the second resistors RM101 and RM102.

Now, the constitution of the mixer will be described in more detail.

The collector of the NPN transistor BN101 of the amplifying circuit 10100 is connected to a connection point of the emitters of the first and the second NPN transistors BM101 and BM102, and an input signal is applied to the base of the NPN transistor BN101. The emitter of the NPN transistor BN101 is connected to one terminal of the resistor RA101, and the other terminal of the resistor RA101 is grounded.

One terminal of the first resistor RM101 and one terminal of the second resistor RM102 of the mixing circuit 10300 are connected to the voltage source Vcc, and the other terminals are connected to the collectors of the first and the second NPN transistors BM101 and BM102, respectively, and form the minus output terminal Vout− and the plus output terminal Vout+ of the mixer, respectively. To the bases of the first and the second NPN transistors, + and − LO signals are inputted, respectively, and emitters are connected to each other.

Now, the operation and problem of the conventional mixer will be described.

The amplifying circuit 10100 amplifies the input signal inputted via the base of the NPN transistor BN101 and outputs it to the mixing circuit 10300. The mixing circuit 10300 mixes the input signal amplified by the amplifying circuit 10100 and local oscillating signals LO+ and LO− that are inputted via the bases of the first and the second NPN transistors BM101 and BM102 and outputs an intermediate frequency signal or base-band signal to the output terminal Vout.

According to the conventional mixer, if an input signal is inputted via the base of the NPN transistor BN101 of the amplifying circuit 10100, harmonic components of the main signal are generated as well as the amplified main signal as described above. Such harmonic components are outputted to the mixing circuit 10300 and mixed with the LO signals. Accordingly, inter-modulation noise is generated on the output terminal Vout of the mixer as well as the intermediate frequency signal or base-band signal of the main signal. Such inter-modulation noise is one of the reasons for decreasing the receiving sensitivity of the signals at the receiving terminal, and it can hardly be removed by filter.

Figure 11:
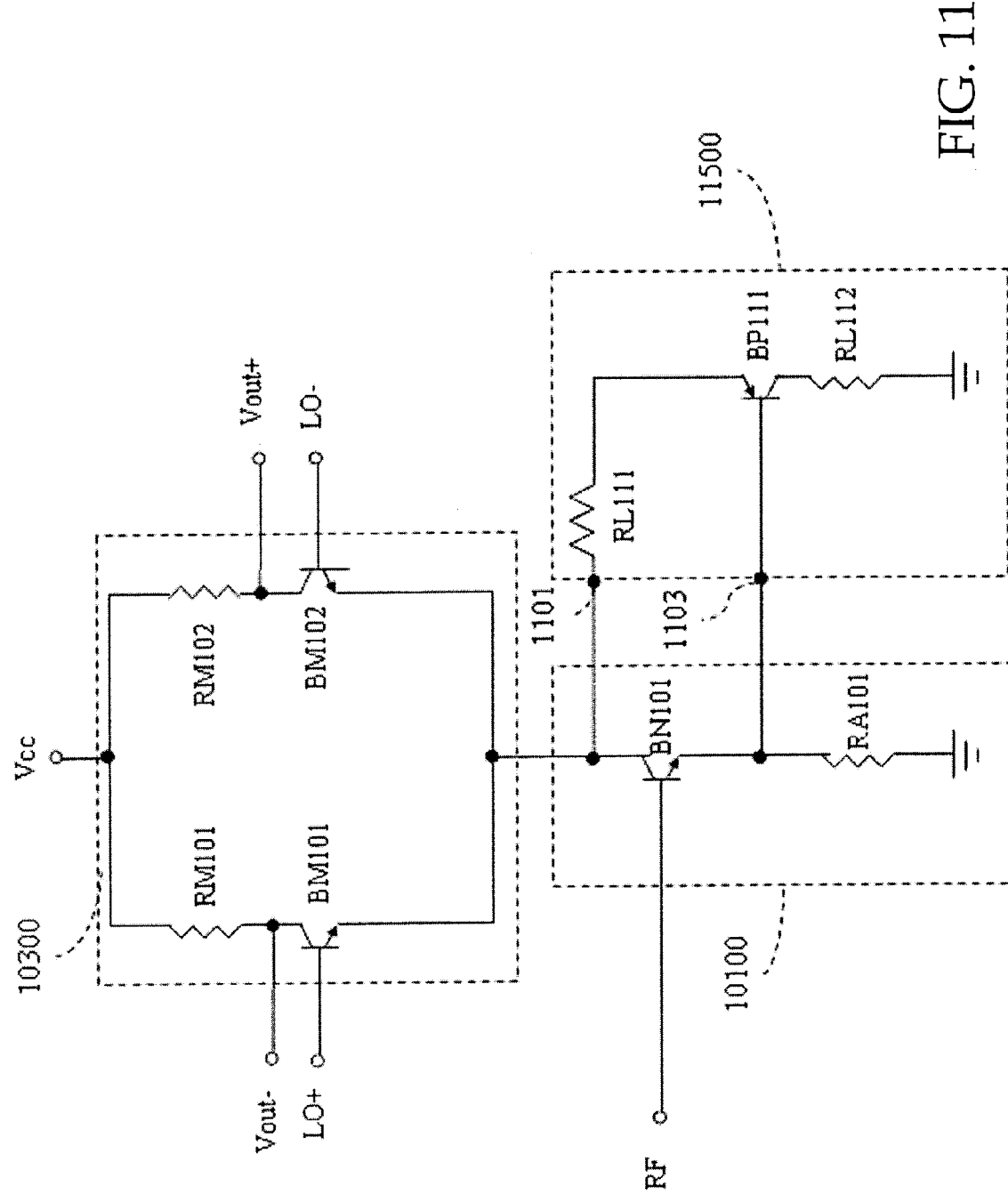
FIG. 11 is a circuit diagram showing an embodiment in which a harmonic circuit according to an embodiment of the present invention is implemented to a mixer.

FIG. 11 is a circuit diagram showing an embodiment in which a harmonic circuit according to an embodiment of the present invention is applied to a mixer.

As shown in FIG. 11, a harmonic circuit 11500 according to an embodiment of the present invention is connected to amplifying circuit 10100 of a mixer. The harmonic circuit 11500 has the first terminal 1101 and the second terminal 1103, the first terminal 1101 is connected to the collector of a NPN transistor BN101 of the amplifying circuit 10100, and the second terminal 1103 is connected to the emitter of the NPN transistor of the amplifying circuit 10100.

Now, the constitution and operation of the mixer in which the harmonic circuit according to an embodiment of the present invention is applied will be described with reference to FIG. 11.

The harmonic circuit 11500 includes the first and the second resistors RL111 and RL112 and a PNP transistor BP111. One terminal of the first resistor RL111 is connected to the first terminal 1101 of the harmonic circuit 11500, and the other terminal is connected to the emitter of the PNP transistor BP111. The base of the PNP transistor BP111 is connected to the second terminal 1103 of the harmonic circuit 11500, and the collector is connected to the one terminal of the second resistor RL112. The other terminal of the second resistor RL112 is grounded.

The harmonic circuit 11500 removes harmonic components generated by the NPN transistor BN101 that is included in the amplifying circuit 10100. That is, if the harmonic components having negative loads are applied to the first terminal 1101 of the harmonic circuit 1500, they are compensated with harmonic components having positive loads generated by the PNP transistor BP111. Therefore, only the amplified main signal is transmitted to the mixing circuit 10300 thereby removing the inter-modulation noise that is appeared at the output terminals Vout+ and Vout− of the mixer, and therefore, the linearity of the mixer is improved.

Moreover, according to another embodiment of the present invention, the PNP transistor BP111 that is included in the harmonic circuit 11500 can be implemented by a plurality of Darlington-connected PNP transistors. At this time, the harmonic components generated by the NPN transistor BN101 of the amplifying circuit 10100 can be removed more minutely, and the mixer having good linearity is obtained.

The idea of the present invention is not confined to specific implementations of the amplifiers and mixers as described above, and the harmonic circuit of the present invention can be applied to the non-linear device including at least on NPN transistor as apparent for those skilled in the art. In addition, the harmonic circuit according to an embodiment of the present invention and application circuits thereof are implemented using BJT devices, however, the spirit of the present invention is applicable to the case that amplifying devices operable complementarily, for example, N-type MOSFET and P-type MOSFET devices are used.

INDUSTRIAL APPLICABILITY

According to the present invention, linearity of the receiver can be improved and receiving sensitivity can be increased by using harmonic circuit.

Moreover, linearity of the amplifier can be improved by removing inter-modulation noise in the amplifier itself without having a separate control circuit in the receiver.

In addition, linearity of the mixer and receiver can be improved by removing inter-modulation noise in the mixer itself without having a separate control circuit in the mixer included in the receiver.

What is claimed is:

1. A harmonic circuit for compensating inter-modulation noise from a signal from a collector of an NPN transistor having a base, emitter, and collector comprising:
    a first terminal being connected to the collector of the NFN transistor;
    a second terminal being connected to the emitter of the NPN transistor;
    a PNP transistor having a base, emitter, and collector, said base being connected to said second terminal;
    a first resistor being connected between said first terminal and said emitter of said PNP transistor; and
    a second resistor being connected between said collector of said PNP transistor and a ground.

2. The harmonic circuit of claim 1, wherein said PNP transistor comprises a plurality of Darlington-connected PNP transistors.

3. The harmonic circuit of claim 1 further comprising a phase shifter connected between said base of said PNP transistor and said second terminal.

4. An amplifier comprising:
    an amplifying circuit having an input terminal and an output terminal, said amplifying circuit being configured to amplify a signal applied to said input terminal and to output an amplified signal to said output terminal, said amplifying circuit having an inductor, first and second NPN transistors, and first and second resistors, a collector of said first NPN transistor being connected to one terminal of said inductor, a base of said first NPN transistor forming said input terminal, an emitter of said first NPN transistor being connected to a base of said second NPN transistor and one terminal of said first resistor, a collector of said second NPN transistor being connected to one terminal of said inductor to form said output terminal, an emitter of said second NPN transistor being connected to one terminal of said second resistor, the other terminal of said inductor being connected to a voltage source, and the other terminals of said first and second resistors being grounded;

a harmonic source circuit having a first terminal being connected to said input terminal of said amplifying circuit and a second terminal, said harmonic source circuit being configured to pre-distort a signal applied to said first terminal and to output said signal to said second terminal; and a harmonic load circuit having a first terminal being connected to said output terminal of said amplifying circuit and a second terminal, said harmonic load circuit being configured to remove harmonic components of a signal applied to said first terminal and to output said signal to said second terminal.

5. The amplifier of claim 4, wherein said first terminal of said harmonic source circuit is connected to said input terminal of said amplifying circuit, said second terminal of said harmonic source circuit is connected to a connection point between said emitter of said first NPN transistor, said base of said second NPN transistor, and said first resistor of said amplifying circuit, and said first terminal of said harmonic load circuit is connected to said output terminal of said amplifying circuit and said second terminal is connected to a connection point between said emitter of said second NPN transistor and said second resistor of said amplifying circuit.

6. An amplifier comprising:

an amplifying circuit having an input terminal and an output terminal, said amplifying circuit being configured to amplify a signal applied to said input terminal and to output an amplified signal to said output terminal, said amplifying circuit having an inductor, first and second NPN transistors, and first and second resistors;

a harmonic source circuit having a first terminal being connected to said input terminal of said amplifying circuit and a second terminal, said harmonic source circuit being configured to pre-distort a signal applied to said first terminal and to output said signal to said second terminal said harmonic source circuit including a PNP transistor having a base, emitter, and collector, in which said base is connected to said second terminal of said harmonic source circuit, a first resistor connected between said first terminal of said harmonic source circuit and said emitter of said PNP transistor, and a second resistor connected between said collector of said PNP transistor and ground; and a harmonic load circuit having a first terminal being connected to said output terminal of said amplifying circuit and a second terminal, said harmonic load circuit being configured to remove harmonic components of a signal applied to said first terminal and to output said signal to said second terminal.

7. The amplifier of claim 6, wherein said harmonic source circuit further comprises a phase shifter connected between said base of said PNP transistor and said second terminal of said harmonic source circuit.

8. An amplifier comprising:

an amplifying circuit having an input terminal and an output terminal, said amplifying circuit being configured to amplify a signal applied to said input terminal and to output an amplified signal to said output terminal, said amplifying circuit having an inductor, first and second NPN transistors, and first and second resistors;

a harmonic source circuit having a first terminal being connected to said input terminal of said amplifying circuit and a second terminal, said harmonic source circuit being configured to pre-distort a signal applied to said first terminal and to output said signal to said second terminal; and a harmonic load circuit having a first terminal being connected to said output terminal of said amplifying circuit and a second terminal, said harmonic load circuit being configured to remove harmonic components of a signal applied to said first terminal and to output said signal to said second terminal, said harmonic load circuit including a PNP transistor having a base, emitter, and collector, in which said base is connected to said second terminal of said harmonic load circuit, a first resistor connected between said first terminal of said harmonic load circuit and said emitter of said PNP transistor, and a second resistor connected between said collector of said PNP transistor and ground.

9. The amplifier of claim 8, wherein said harmonic load circuit further comprises a phase shifter connected between said base of said PNP transistor and said second terminal of said harmonic load circuit.

10. The harmonic circuit of claim 8, wherein said PNP transistor comprises a plurality of Darlington-connected PNP transistors.

11. An amplifier comprising:

an amplifying circuit having an input terminal and an output terminal, said amplifying circuit being configured to amplify a signal applied to said input terminal and to output an amplified signal to said output terminal, said amplifying circuit having an inductor, first and second NPN transistors, and first and second resistors, said amplifying circuit including a collector of said first NPN transistor is connected to one terminal of said inductor, a base of said first NPN transistor forms said input terminal, an emitter of said first NPN transistor is connected to a base of said second NPN transistor and one terminal of said first resistor, a collector of said second NPN transistor is connected to said one terminal of said inductor to form said output terminal, an emitter of said second NPN transistor is connected to one terminal of said second resistor, the other terminal of said inductor is connected to a voltage source, and the other terminals of said first and second resistors are grounded;

a harmonic circuit having a first terminal being connected to said output terminal of said amplifying circuit and a second terminal being connected to said input terminal of said amplifying circuit, said harmonic circuit being configured to remove harmonic components of said signal applied to said first terminal and outputs said signal to said second terminal.

12. An amplifier comprising:

an amplifying circuit having an input terminal and an output terminal, said amplifying circuit being configured to amplify a signal applied to said input terminal and to output an amplified signal to said output terminal, said amplifying circuit having an inductor, first and second NPN transistors, and first and second resistors;

a harmonic circuit having a first terminal being connected to said output terminal of said amplifying circuit and a second terminal being connected to said input terminal of said amplifying circuit, said harmonic circuit being configured to remove harmonic components of said signal applied to said first terminal and outputs said signal to said second terminal, said harmonic circuit including
- a PNP transistor having a base, emitter, and collector, in which said base is connected to said second terminal of said harmonic circuit,
- a first resistor connected between said first terminal of said harmonic circuit and said emitter of said PNP transistor, and
- a second resistor connected between said collector of said PNP transistor and ground.

13. The amplifier of claim 12, wherein said harmonic circuit further comprises a phase shifter connected between said base of said PNP transistor and said second terminal of said harmonic circuit.

14. An amplifier comprising:
an amplifying circuit having an input terminal and an output terminal, said amplifying circuit being configured to amplify a signal applied to said input terminal and to output an amplified signal to said output terminal, said amplifying circuit having an inductor, first and second NPN transistors, and first and second resistors;
a harmonic circuit having a first terminal being connected to said output terminal of said amplifying circuit and a second terminal being connected to said input terminal of said amplifying circuit, said harmonic circuit being configured to remove harmonic components of said signal applied to said first terminal and outputs said signal to said second terminal, said harmonic circuit including a diode device having a first terminal and a second terminal, said first terminal of said diode forming said first terminal of said harmonic circuit and said second terminal of said diode forms said second terminal of said harmonic circuit in said diode device.

15. The amplifier of claim 14, wherein said harmonic circuit further comprises a phase shifter connected between said second terminal of said diode device and said second terminal of said harmonic circuit.

16. The amplifier of claim 11, further comprising a variable resistor connected between said input terminal of said amplifying circuit and said emitter of said second NPN transistor of said amplifying circuit.

17. A mixer comprising:
an amplifying circuit being configured to amplify an input signal;
a mixing circuit being configured to mix an output signal of said amplifying circuit and local oscillating signal and output an intermediate frequency signal or baseband signal; and
a harmonic circuit having a first and a second terminals connected to said amplifying circuit, said harmonic circuit being configured to remove a harmonic component of a signal applied from said first terminal and to output said signal to said second terminal,
said amplifying circuit having at least one NPN transistor and said first and second terminals of said harmonic circuit being respectively connected to a collector and emitter of said NPN transistor.

18. A mixer comprising:
an amplifying circuit being configured to amplify an input signal;
a mixing circuit being configured to mix an output signal of said amplifying circuit and local oscillating signal and output an intermediate frequency signal or baseband signal; and
a harmonic circuit having a first and a second terminals connected to said amplifying circuit, said harmonic circuit being configured to remove a harmonic component of a signal applied from said first terminal and to output said signal to said second terminal, said harmonic circuit having
- a PNP transistor having a base, emitter, and collector, said base being connected to said second terminal of said harmonic circuit,
- a first resistor being connected between said first terminal of said harmonic circuit and said emitter of said PNP transistor, and
- a second resistor being connected between said collector of said PNP transistor and a ground.

19. The mixer of claim 18, wherein said PNP transistor of said harmonic circuit comprises a plurality of Darlington-connected PNP transistors.

20. The mixer of claim 18, wherein said harmonic circuit further comprises a phase shifter connected between said base of said PNP transistor and said second terminal of said harmonic circuit.

* * * * *